US009067521B1

(12) United States Patent
Masanek, Jr. et al.

(10) Patent No.: US 9,067,521 B1
(45) Date of Patent: Jun. 30, 2015

(54) CARGO ORGANIZER

(71) Applicant: MacNeil IP LLC, Bolingbrook, IL (US)

(72) Inventors: Frederick W. Masanek, Jr., Barrington, IL (US); David S. Iverson, Hinsdale, IL (US); Radoslaw Nowak, Wood Dale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 14/530,277

(22) Filed: Oct. 31, 2014

(51) Int. Cl.
*B60P 7/08* (2006.01)

(52) U.S. Cl.
CPC .................................... *B60P 7/0892* (2013.01)

(58) Field of Classification Search
CPC .................................................... B60P 7/0892
USPC ................... 410/94, 121, 129, 140; 296/37.1
See application file for complete search history.

(56) References Cited

U.S. PATENT DOCUMENTS

| 4,027,892 | A | 6/1977 | Parks |
| 4,512,503 | A | 4/1985 | Gioso |
| 4,718,584 | A | 1/1988 | Schoeny |
| 4,838,745 | A | 6/1989 | Haydock |
| 4,842,460 | A | 6/1989 | Schlesch |
| 4,884,733 | A | 12/1989 | Geeves |
| 4,941,784 | A | 7/1990 | Flament |
| 5,031,769 | A | 7/1991 | Shea et al. |
| 5,102,253 | A | 4/1992 | Conti |
| 5,161,700 | A | 11/1992 | Stannis et al. |
| 5,167,433 | A | 12/1992 | Ryan |
| 5,205,602 | A | 4/1993 | Hoare et al. |
| 5,392,972 | A | 2/1995 | Caruso et al. |
| 5,518,170 | A | 5/1996 | Rasmussen |
| 5,549,428 | A | 8/1996 | Yeatts |
| 5,601,271 | A | 2/1997 | Janowski et al. |
| 5,605,108 | A | 2/1997 | Woosley |
| 5,655,863 | A | 8/1997 | Mundt |
| 5,662,305 | A | 9/1997 | Shimamura et al. |
| 5,819,996 | A | 10/1998 | Koons, Jr. |
| 5,865,580 | A | 2/1999 | Lawrence |
| 5,975,819 | A | 11/1999 | Cola |
| 6,012,885 | A | 1/2000 | Taylor et al. |
| 6,109,847 | A | 8/2000 | Patel et al. |
| 6,244,802 | B1 | 6/2001 | Stanesic et al. |
| 6,564,397 | B1 | 5/2003 | Hawley et al. |

(Continued)

OTHER PUBLICATIONS

USPTO as International Searching Authority, International Search Report and Written Opinion of the International Searching Authority issued in connection with PCT/US2014/044524 on Oct. 24, 2014.

*Primary Examiner* — Stephen Gordon
(74) *Attorney, Agent, or Firm* — Perkins IP Law Group LLC; Jefferson Perkins

(57) ABSTRACT

Board channels of a cargo organizer are defined by towers disposed at the rear margins of the organizer base and upstanding walls spaced forwardly from the towers. The upstanding walls are located rearwardly of a base plate adapted to be placed underneath an item of cargo to be contained. The board channels are formed at an angle to each other, such that each of several organizers may be disposed at respective vertices of a cargo restraining polygon. The organizer walls are joined to the base by inserting barbs disposed on the lower surface of the walls into respective barb receivers. Side margins of the barb receivers mate with side margins of recesses in the lower margin of the wall. Relieved areas formed in the front surface of the organizer wall mate with upstanding plates of the base.

5 Claims, 18 Drawing Sheets

(56) References Cited

U.S. PATENT DOCUMENTS

| | | |
|---|---|---|
| 6,623,840 B2 | 9/2003 | Hainbach |
| 6,702,532 B1 | 3/2004 | Throener |
| 7,306,416 B1 | 12/2007 | Arico |
| 7,636,960 B2 | 12/2009 | Hawley et al. |
| 7,959,390 B2 * | 6/2011 | Gorski .......................... 410/121 |
| 8,430,714 B2 | 4/2013 | Benincasa et al. |
| 2009/0152523 A1 | 6/2009 | Erwin |
| 2013/0095295 A1 | 4/2013 | Masanek, Jr. et al. |

\* cited by examiner

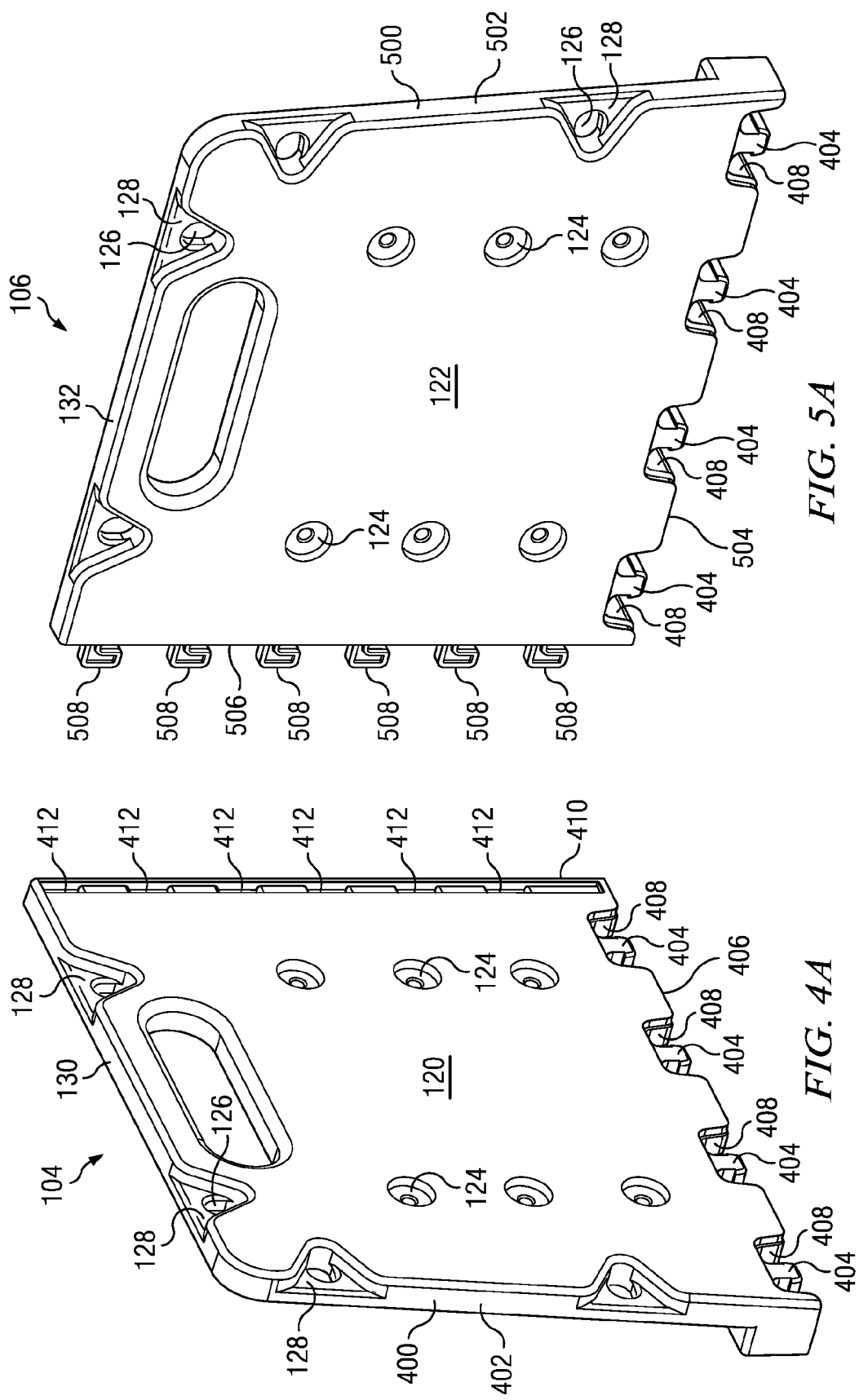

CARGO ORGANIZER

BACKGROUND OF THE INVENTION

It is a commonplace that articles being transported by vehicles often are much smaller in size than the cargo area in which they are placed. Without restraint, such articles may have a tendency to shift as the vehicle is accelerated, decelerated or turned, sometimes causing damage to the articles in question, the cargo area, or both. Cargo organizers and restraining systems have therefore been developed to stop the shifting or rolling of articles as they are being transported. Several such cargo organizers have been developed for relatively small articles or collections of same, as might be employed within the trunk of an automobile or the cargo area of a minivan. Representative of these are ones shown in Arico U.S. Pat. No. 7,306,416; Stanesic et al. U.S. Pat. No. 6,244,802 and Taylor et al. U.S. Pat. No. 6,012,885.

The problems associated with cargo shifting get worse as the size and mass of the article being transported grow. For larger and heavier items, such as might be transported in pickup trucks, the cargo restraining systems get more elaborate and require a good deal of buckling, tying down and/or other preparation before travel. Ideally, a cargo restraining system should be flexible enough to cage or restrain articles of different sizes, including possibly large articles or collections of same, and should be easy for the user to deploy.

SUMMARY OF THE INVENTION

According to one aspect of the invention, a cargo organizer has a base, including a base plate that is adapted to be placed underneath an article to be contained. At each of the left and right rear margins of the base, first and second upstanding, spaced-apart towers are formed. An upstanding, substantially planar first wall is positioned forwardly from the first tower and rearwardly from the base plate. An upstanding, substantially planar second wall is positioned forwardly from the second tower and rearwardly from the base plate. A right end of the first wall is joined to a left end of the second wall at an angle. A front surface of the first tower and a back surface of the first wall form a first board channel adapted to receive a first board of predetermined dimensions, which may be a milled piece of lumber of a standard size. A front surface of the second tower and a back surface of the second wall form a second board channel adapted to receive a second board of predetermined dimensions, which may be a milled piece of lumber of a standard size. The cargo organizer may be used with other, like cargo organizers to contain cargo, with or without the use of connecting boards.

In one embodiment there are a plurality of first towers and a plurality of second towers, respectively disposed, in spaced-apart relation, at the left and right rear margins of the base. Front surfaces of the first towers help to define the first board channel while front surfaces of the second towers help to define the second board channel.

Plural cargo organizers as above described may be used, with interconnecting boards, to create a cargo containment system. Each cargo organizer is positioned at a vertex of a polygon and each board is a side of the polygon. In one embodiment the polygon is a square or rectangle. The user may easy change the size or shape of the polygon by using interconnecting boards of different lengths.

According to another aspect of the invention, a base of a cargo organizer has a base plate that is adapted to be placed underneath an article of cargo. At least one upstanding wall is assembled to the base to bound the base plate. A lower surface of the wall has plural, spaced-apart, downwardly facing recesses, each of which have left and right margins. Located in between the left and right margins is a downwardly depending barb. The base has plural, laterally spaced-apart barb receivers that receive respective ones of the barbs. Each barb receiver has a central opening for receiving a barb, an upstanding left margin spaced to the left of the central opening, and an upstanding right margin spaced to the right of the central opening. When the wall is assembled to the base, the barbs are received by the receivers, the left margins of the wall recesses mate with the left margins of the receivers, and the right margins of the wall recesses mate with the right margins of the receivers. In this fashion, lateral movement of the wall relative to the base, and within the plane of the wall, is prevented.

In one embodiment, first and second walls are assembled to the base using barbs and receivers as above described.

According to another aspect of the invention, a base of a cargo organizer includes a base plate adapted to be placed underneath an article of cargo. At least one upstanding wall is assembled to the base at a channel disposed rearwardly of the base plate. A rear wall of the channel is sloped upwardly and rearwardly from a channel floor. The wall has a front web disposed adjacent to the base plate and spaced-apart reinforcing ribs that extend rearwardly from the front web. In a foot of the wall that is adapted for insertion into the base wall channel, rear ends of the ribs conform to the sloped surface of the rear wall of the wall channel of the base, such that the wall will be wedged into the channel of the base.

In one embodiment, the wall channel of the base is further defined by a plurality of upstanding plates that are disposed in alignment with a front edge of the channel. The front plates are disposed forwardly of the wall when the wall is assembled to the channel of the base. In one embodiment, the wall has a front surface that is disposed adjacent to the base plate. A plurality of relieved areas are formed adjacent to a bottom margin of the wall. Each relieved area has a surface that is rearwardly spaced from the front surface of the wall by a predetermined relief depth. The upstanding plates each have a thickness that is substantially equivalent to the relief depth. Each upstanding plate in the base is received into a respective relieved area of the wall when the wall is assembled to the base. The wall-receiving channel, as so defined, prevents motion of the wall relative to the base in a direction orthogonal to the plane of the wall. This rigidity enhances the strength of the connection of the wall to the base.

BRIEF DESCRIPTION OF THE DRAWINGS

Further aspects of the invention and their advantages can be discerned in the following detailed description, in which like characters denote like parts and in which:

FIGS. 4A and 4B are front and back perspective views of a first wall which may be used as a component of the cargo organizer shown in FIG. 1;

FIGS. 5A and 5B are front and back perspective views of a second wall which may be used as a component of the cargo organizer shown in FIG. 1;

DETAILED DESCRIPTION

Figure 1:
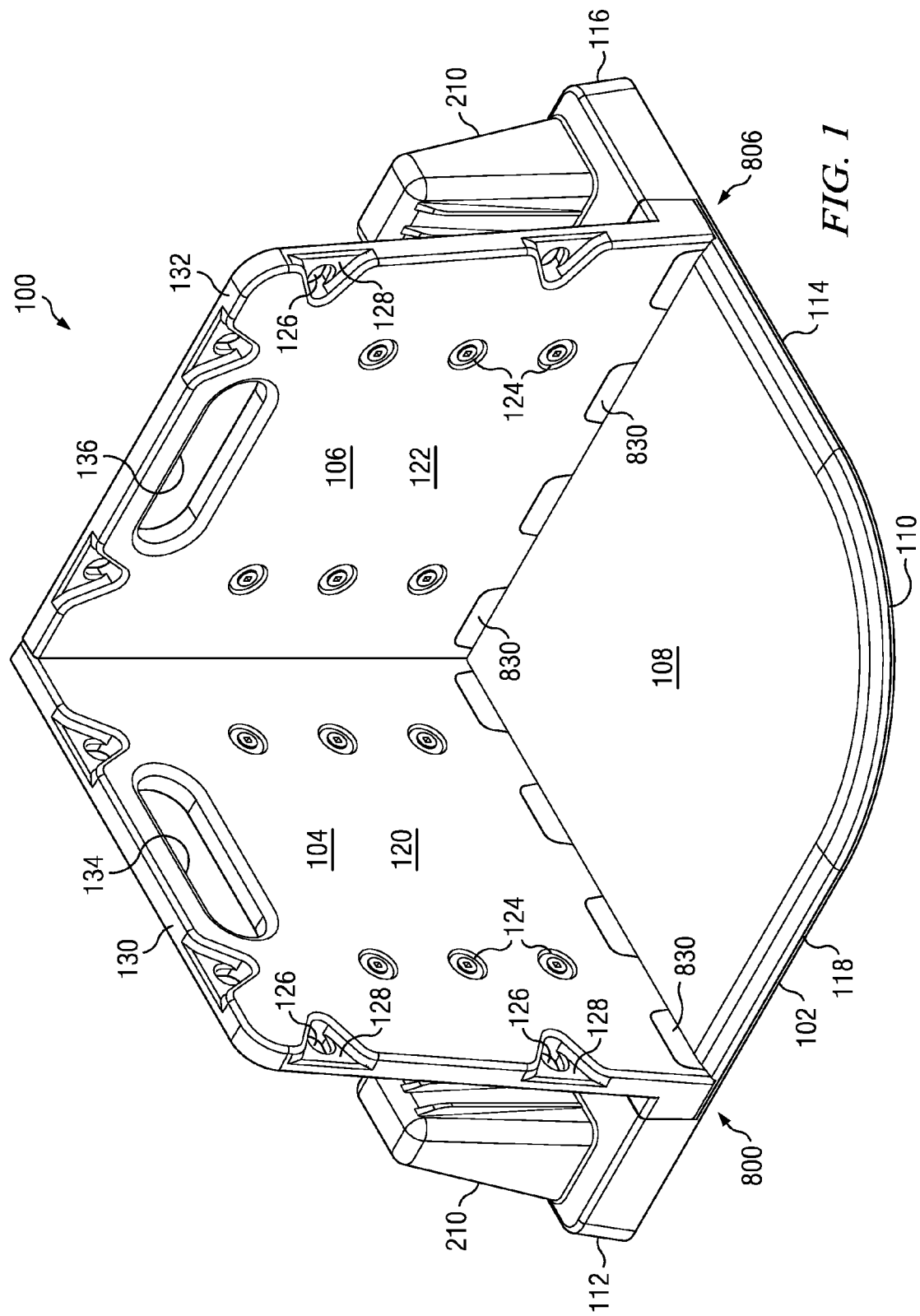
FIG. 1 is a top perspective view of an assembled cargo organizer according to one embodiment of the invention.

Referring to FIG. 1, one embodiment of a cargo organizer, indicated generally at 100, has three main components: a base 102, a first upstanding organizer wall 104 and a second upstanding organizer wall 106. The walls 104 and 106 are assembled to the base 106 so as to form a rigid corner having three sides, as might conveniently receive a six-sided rectangular prism box or carton of the conventional type (not shown). While the illustrated embodiments position organizer walls 104 and 106 at right angles to each other, walls 104 and 106 can be disposed at 60 degrees to each other, 120 degrees to each other or at other angles. The base 102 has a flat base plate 108 which extends horizontally forwardly from wall 104 and from wall 106. The base plate 108 is adapted to be placed underneath an article (not shown) to be contained or restrained. Plate 108 is used to transmit the weight of the contents being contained or restrained (such as a carton) onto the bottom surface of the base 102 (seen, e.g., in FIG. 2 or 2A), thereby enhancing the frictional force which the organizer 100 will have relative to the surface or substrate on which it sits. That surface, not shown, can be a bed of a pickup truck, the cargo area of a van or sport utility vehicle (SUV) or the like, or a polymer liner covering any of these vehicle surfaces.

One embodiment of this invention is sized to contain larger packages or collections of same. Hence, a radius of a front curved portion of the base plate margin 110, measured to the interior corner of walls 104 and 106, can be 6 inches, an assembled height of the organizer 100 can be 9.1 inches, a length from a left rear margin 112 to right front margin 114 can be 14 inches, and likewise a width from a right rear margin 116 of the base 102 to a left front margin 118 can be 14 inches. A length of base plate 108, from a forward surface 120 of wall 104 to opposed right front margin 114, can be 10 inches. A width of base plate 108, from a forward surface 122 of wall 106 to opposed left front margin 118, can be 10 inches.

The first organizer wall 104 may have several counterbored holes 124 sized to receive the heads of screws, and possibly washers threaded onto the screw shafts to be disposed immediately to the rear of the screw heads, so that the front end of each screw does not protrude beyond forward-facing surface 120. Second wall 106 may likewise have several such counterbored holes 124, so that the heads of screws inserted into them do not protrude inwardly beyond forward-facing surface 122. In the illustrated embodiment, each wall 104, 106 has a 2×3 array of screw holes 124, which are provided in vertically and/or horizontally spaced relation to each other. Advantageously, each wall 104, 106 can have one or more recessed holes 126 for tie-downs or bungee cords (not shown). The recesses 128 around holes 126 are sized and shaped to avoid having any part of a terminating fastener (such as a hook or knot) extend inwardly beyond forward wall surfaces 120, 122.

Walls 104, 106 further may have, near their top margins 130, 132, horizontally elongate handle holes 134, 136 that are sized for a user's hand to grasp. This permits the user to better manipulate and position the assembled cargo organizer 100 so as to be located underneath and adjacent the cargo load (not shown). Handles 134, 136 are so positioned that even after assembly of the organizer 100 to wooden or other crosspieces, as described below, they will be freely accessible by a hand of a user, who may then move an assembled cargo containment system as a unit (see FIGS. 3 and 3A).

The body 202 of base 102, and the entirety of organizer walls 104, 106, may be injection-molded of a tough plastic such as high-impact polypropylene.

Figure 2:
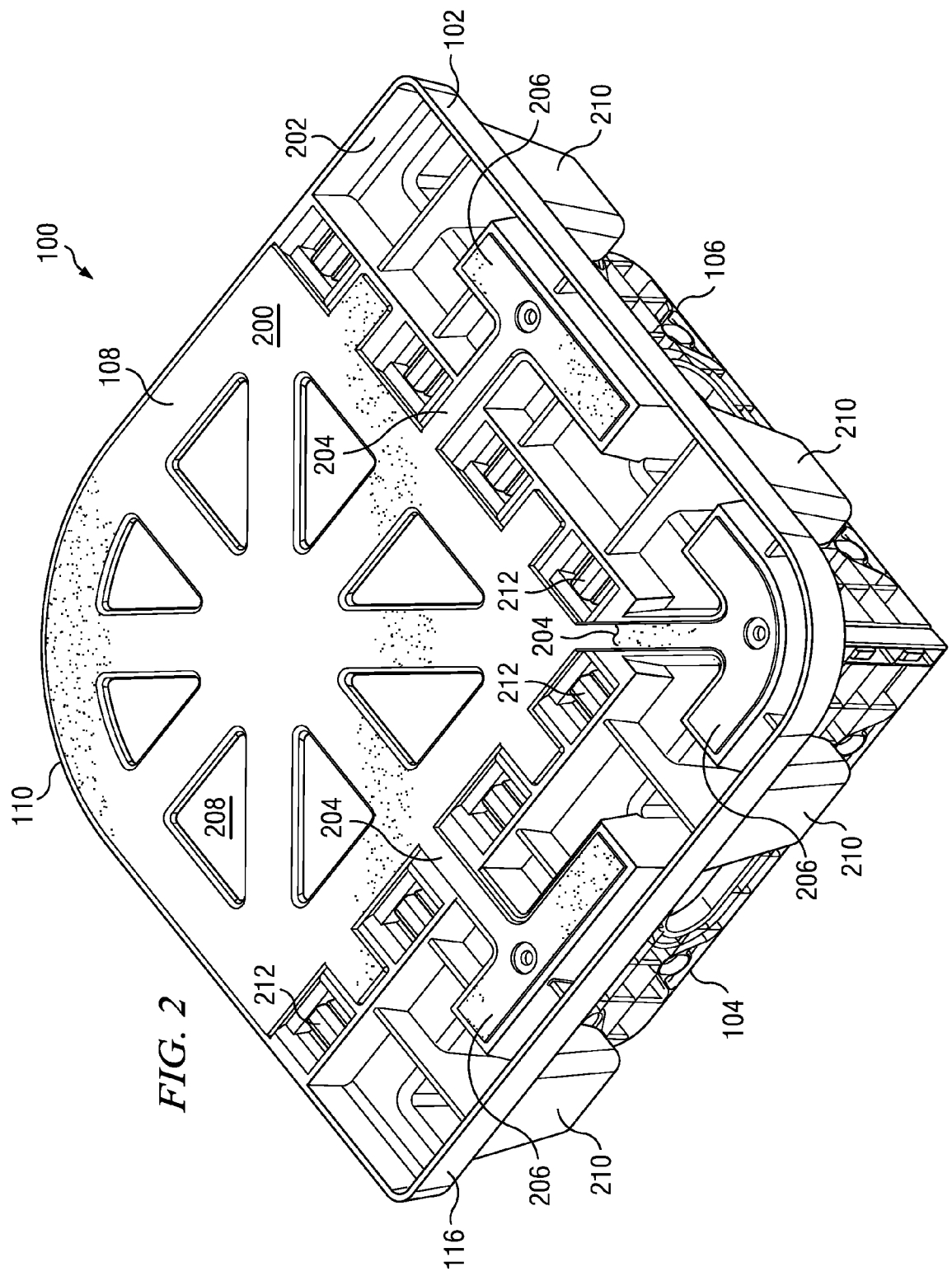
FIG. 2 is bottom perspective view of an embodiment of the cargo organizer illustrated in FIG. 1.

In the bottom perspective view of FIG. 2, there is seen a friction pad 200 that, in this illustrated embodiment, is overmolded onto a body 202 of the base 102. The friction pad 200 may be a thermoplastic elastomer (TPE) having a durometer that is softer than the plastic used to form body 202 and walls 104, 106. The material chosen for friction pad 200 can have a higher coefficient of friction with respect to a supporting surface or substrate (such as a pickup truck bed liner or cargo liner) than the material used to mold walls 104, 106 and body 202. The friction pad 200 is overmolded on a large portion of the bottom of the base plate or apron 108, here appearing in a British-flag design. Additionally, extensions 204 of pad 200 extend horizontally outwardly to bars 206, ones of which are positioned at least roughly underneath the walls 104, 106. Hence, the weight of walls 104, 106, and of any wooden (or other) boards used to complete a cargo containment system, can be used to enhance the frictional force of the organizer 100 relative to the surface on which it sits. However, in this embodiment the overmolded friction pad 200 does not extend to those portions of the body lower surface 208 from which upwardly extend hollow towers or piers 210, and further do not extend over any of the wall barb receivers 212.

Figure 2A:
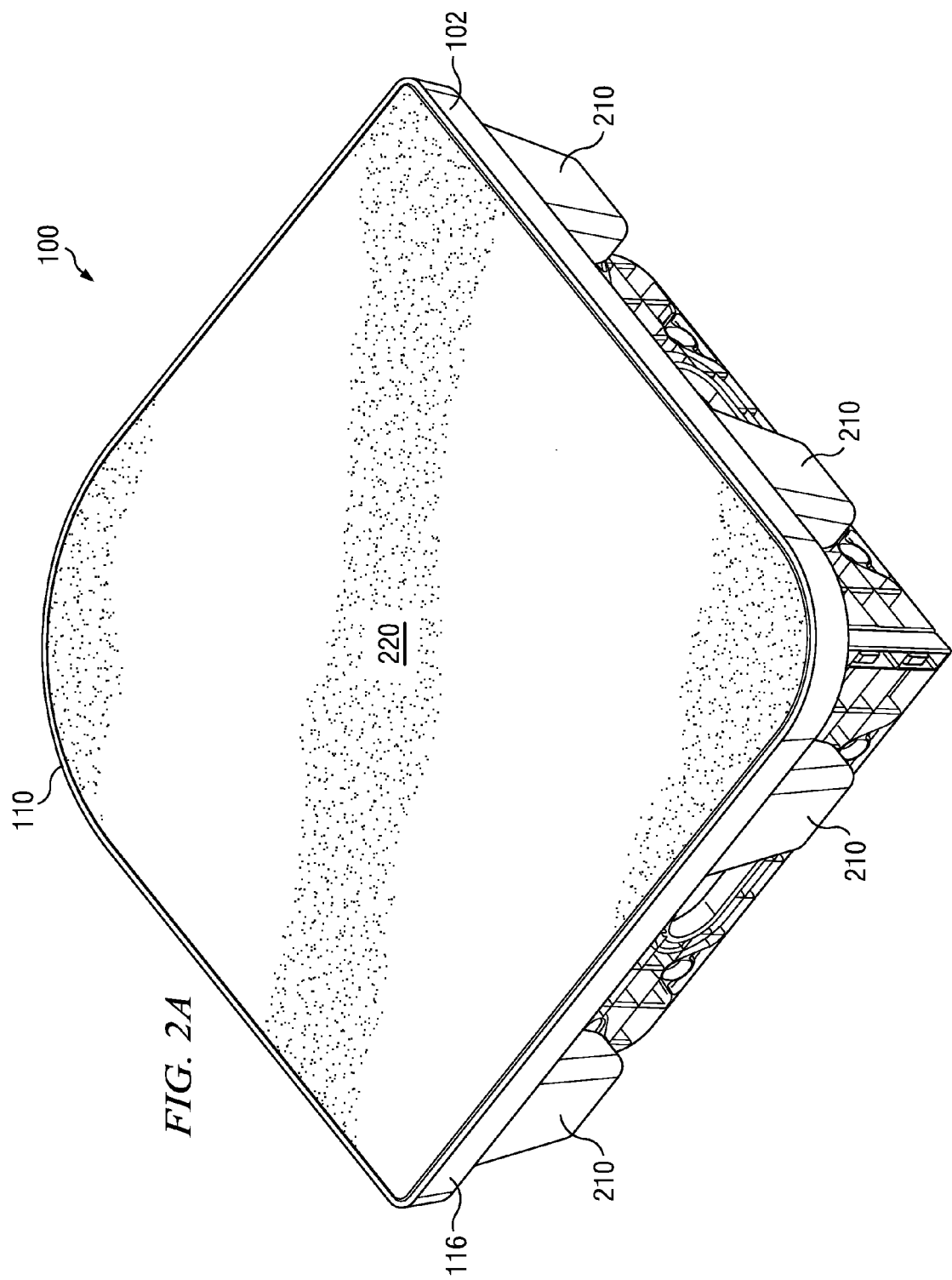
FIG. 2A is a bottom perspective view of an embodiment of the cargo organizer alternative to the one shown in FIG. 2.

In FIG. 2A, illustrating an embodiment alternative to that shown in FIG. 2, a friction pad 220 may be shaped to cover the entire bottom surface of base 102. Such a friction pad would be separately molded and would be attached to the bottom of base 102 by the way of adhesive, snaps, clips, other fasteners or combinations of these.

Figure 3:
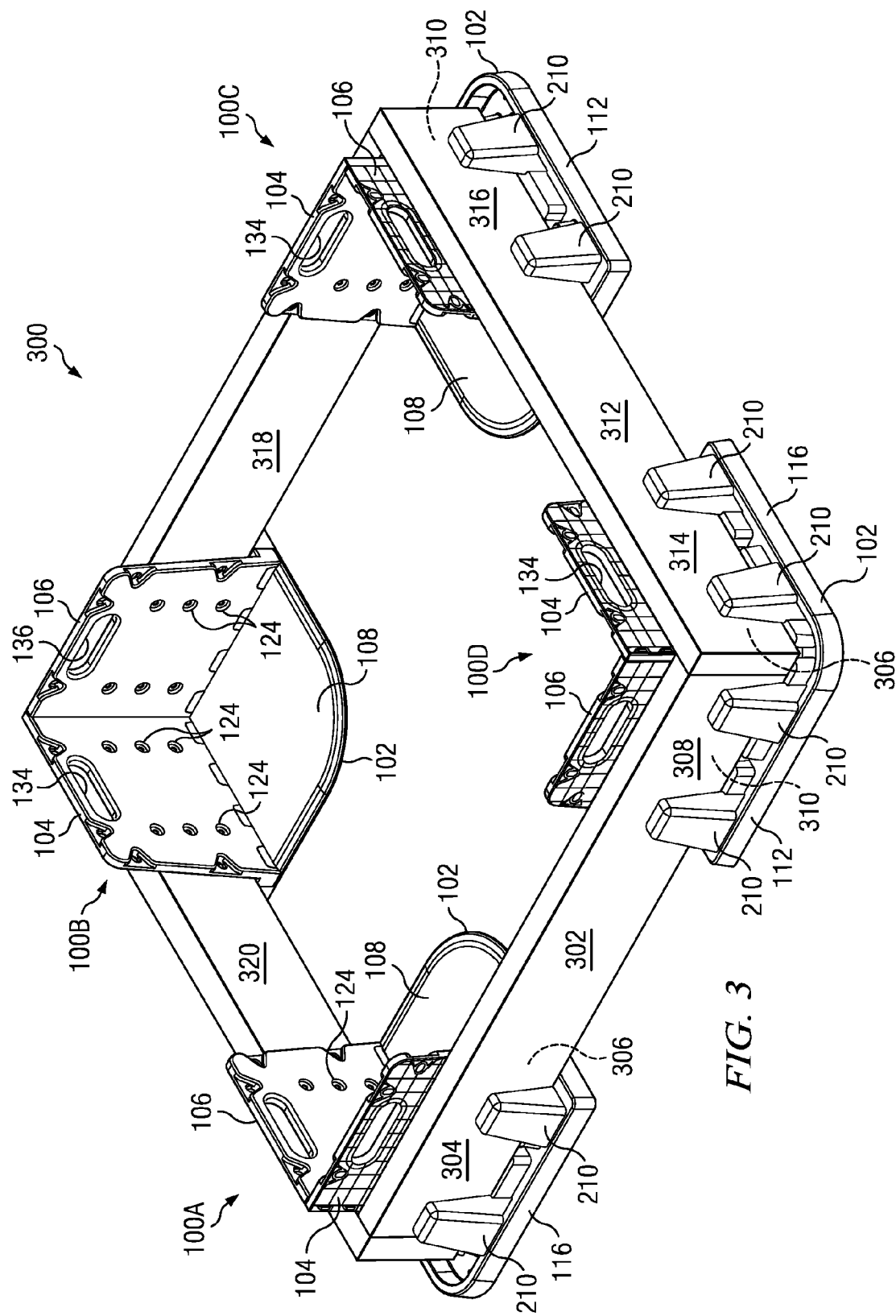
FIG. 3 is a perspective view of a cargo containment system constructed using four cargo organizers and boards of a commonly milled size.

One inventive aspect of the cargo organizer 100 is that it can be used with other cargo organizers 100 to create a rigid box-like or other polygonal cargo containment system, a representative example of which is shown at 300 in FIG. 3. The system 300 includes four cargo organizers 100A, 100B, 100C, 100D positioned at the corners of a rectangle, the dimensions of which may be preselected to closely contain one large item or a caged group of several smaller ones (not shown). For example, a first board 302, which in the illustrated embodiment is a 2×6 (nominal) piece of lumber, has one end 304 inserted into a board channel 306 formed by the wall 104 of organizer 100A and adjacent towers 210 of the base 102 of organizer 100A. A second, opposed end 308 of the board 302 is inserted into a board channel 310 formed by wall 106 of organizer 100B and adjacent towers 210 of base 102 of organizer 100D. A second board 312, which may be chosen to have a length which is the same or different from the length of board 302, has a first end 314 which is inserted into the board channel 306 defined by wall 104 of organizer 100D and adjacent towers 210 of the base 102 of organizer 100D. A second, opposed end 316 of board 312 is inserted into a board channel 310 defined by wall 106 of cargo organizer 100C and adjacent towers 210 of the base 102 of organizer 100C. Similarly, a board 318 has first and second ends respectively inserted into board channels respectively defined by components of organizers 100C and 100B, and a board 320 has first and second ends respectively inserted into board channels respectively defined by components of organizers 100B and 100A. The length of board 318 may be chosen to be the same as board 302, and the length of board 320 may be chosen to be the same as board 312. The organizers 100A-100D may be used with boards of other lengths, in order to create enclosures of different sizes and proportions. Board channels 306 and 310 of the illustrated cargo organizers 100A-D subtend an angle with respect to each other of ninety degrees, so that the organizers 100A-D may occupy respective vertices of a right rectangle. Other cargo organizers according to the invention may have angles between the board channels in each organizer other than 90 degrees, and such organizers can be used to form containment systems on the plan of polygons other than right rectangles, such as triangles and hexagons.

Figure 3A:
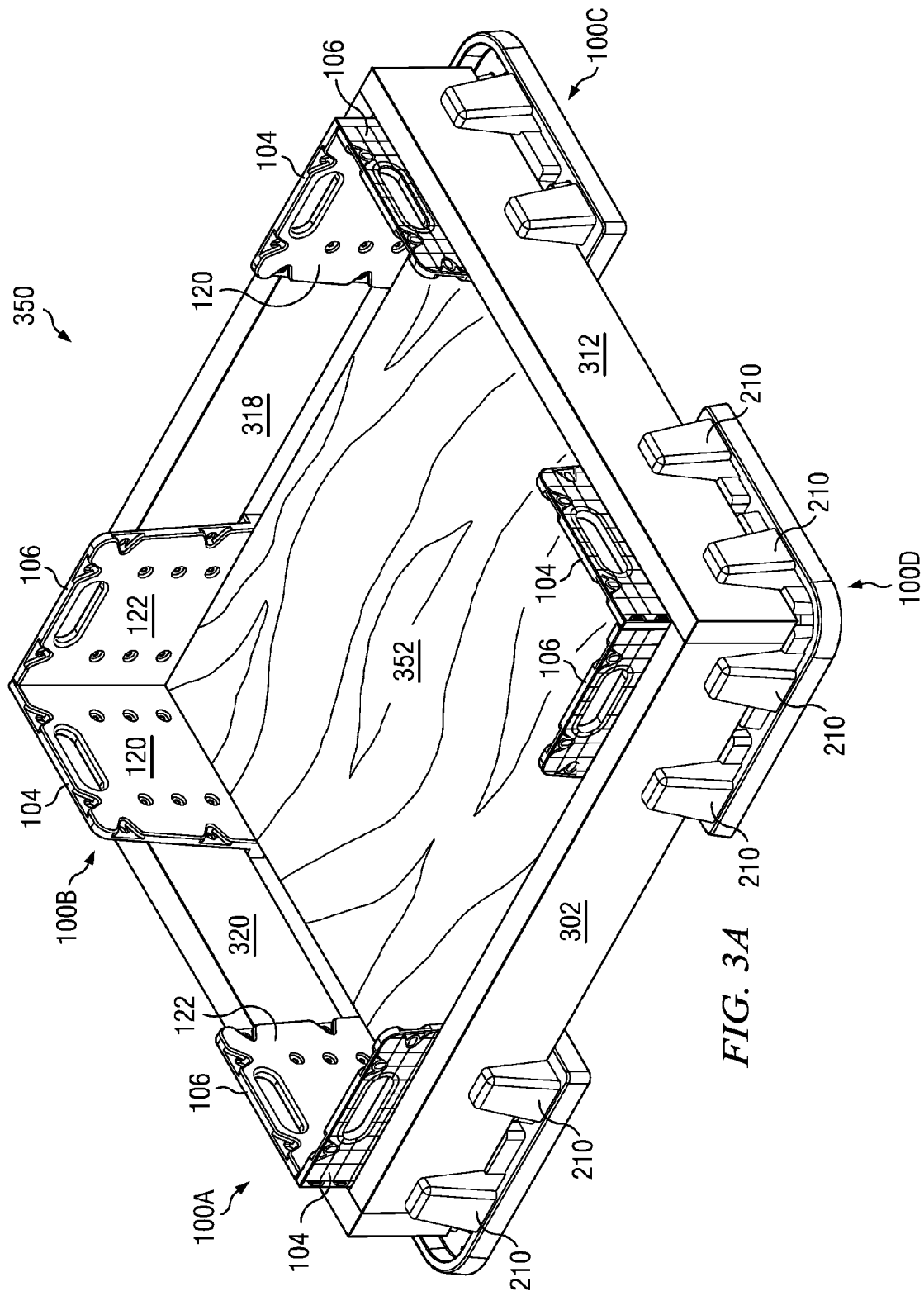
FIG. 3A is a perspective view of the cargo containment system of FIG. 3, showing the addition of a floor within the containment area.

In a related embodiment, a cargo containment system 350, shown in FIG. 3A, is similar to system 300 as shown in FIG. 3, with the addition of a floor 352 that is sized to extend between front surfaces 120 and 122 of the upstanding organizer walls 104, 106 of the organizers 100A-100D. Such a floor, as may be formed by a plywood sheet, is useful to pre-pack the cargo containment system 350 prior to its placement, all at once, in the vehicle, in an area such as a bed of a pickup truck (not shown).

Walls 104 and 106 are shown in more detail in FIGS. 4A, 4B, 4C, 5A, 5B and 5C. Each counterbored screw hole 124 is sized to be large enough to receive the head of a common deck screw and, immediately rearward of it, a washer. The tie-down recesses 128 open either onto a top margin 130 or 132, or a side margin 400, 500 of respective free ends 402, 502 of the walls 104, 106.

Each of the walls 104, 106 has a plurality of spaced-apart barbs or prongs 404 on its respective lower edge or margin 406, 504. Each barb 404 projects downwardly within a respective downwardly facing recess 408 made in the lower edge 406 or 504 of the wall 104 or 106. Wall 104 has a vertical joining side or end 410 (here, the right end) opposite end 402. A plurality of inwardly facing openings or slots 412 are spaced apart in a channel near right margin 410. In the illustrated embodiment, the wall 106 is mostly a mirror image of the wall 104, with the exception that in the place of openings or slots 412, the joining side or margin 506 of wall 106 has a plurality of leftwardly and then downwardly extending hooks or fingers 508, each of which is adapted to be received into a respective opening 412 in wall 104. The position of hooks 508 and openings 412 alternatively could be reversed from the positions shown, or the joining side margins 410, 506 could have both hooks and openings.

Figure 4B:
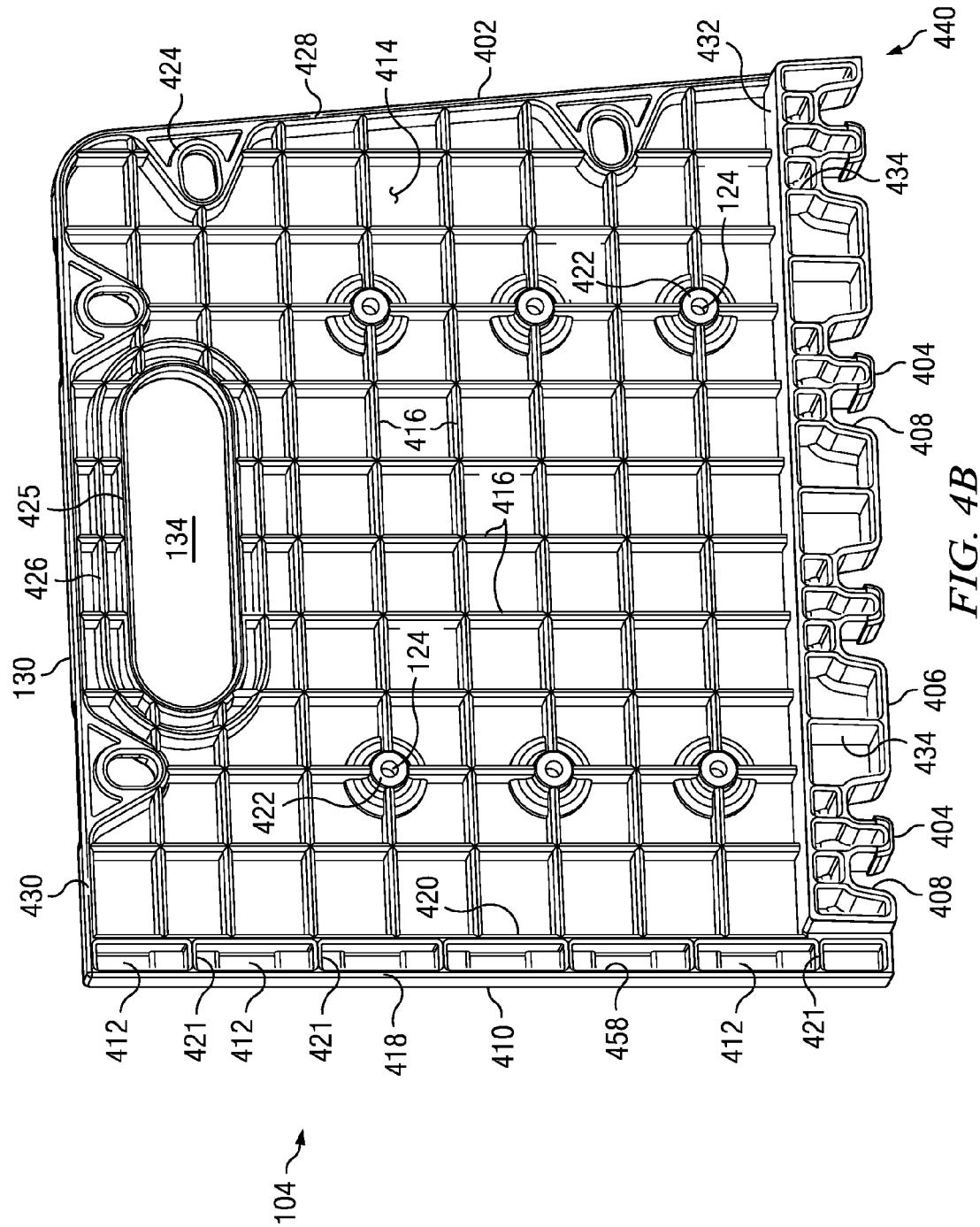
Figure 5B:
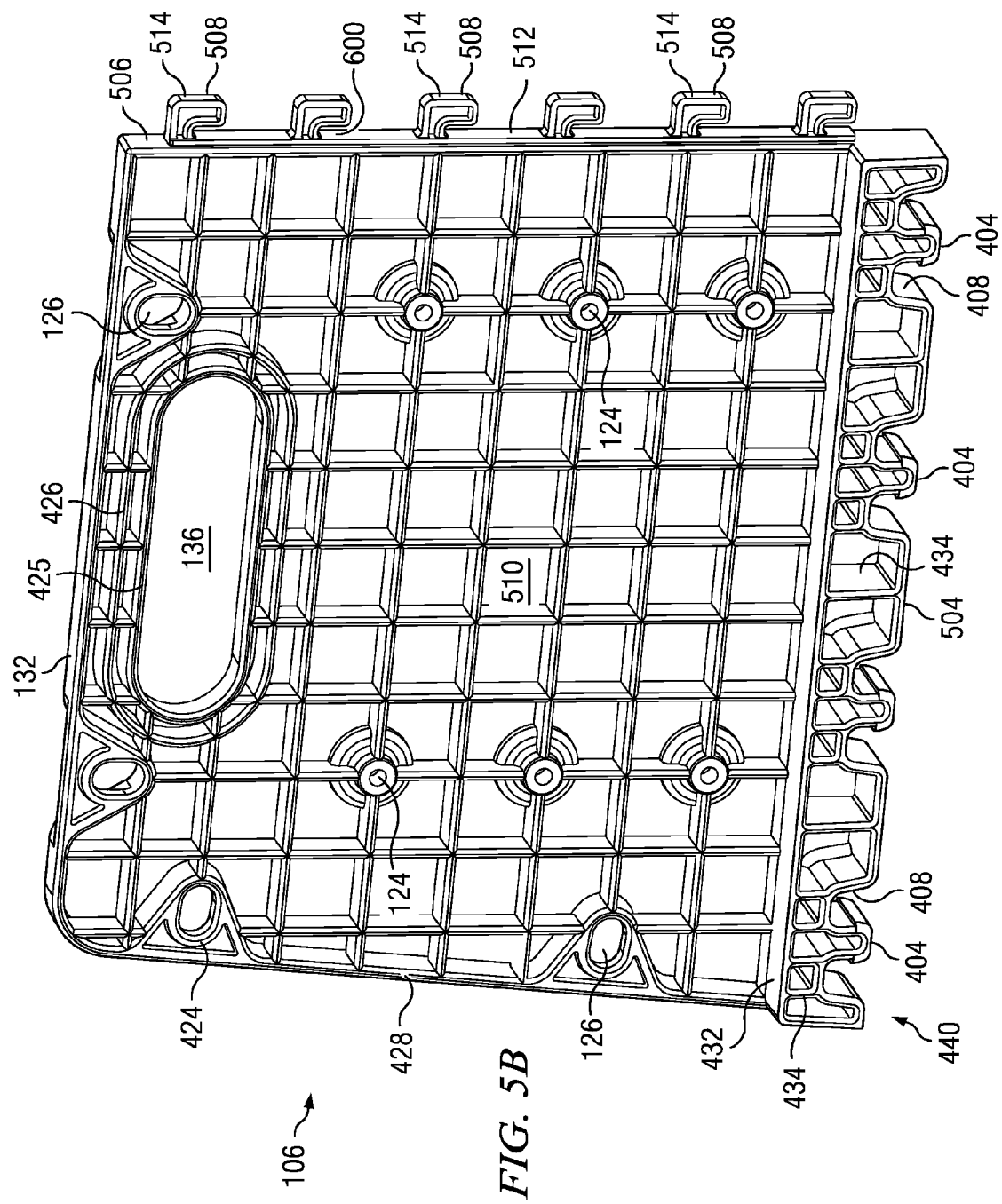

As seen in FIGS. 4B and 5B, walls 104 and 106 are constructed to have a relatively thin, vertically disposed front web 414, 510, having a preselected nominal wall thickness for proper injection molding. This nominal wall thickness can be 0.125", for example. The webs 414, 510 face frontwardly, where the packages or other cargo are to be contained, such that the front surfaces 120, 122 thereof (see FIG. 1) are mostly entire, have few openings and present extensive abutment faces for the contained cargo. On their back faces are a series of reinforcing ribs 416 that extend orthogonally rearwardly to an extent sufficient to withstand the load on the front surfaces 120, 122. Most of the reinforcing ribs 416 may be constituted by an intersecting network of vertical and horizontal ribs, as shown. These ribs can have a thickness of 0.100", for example.

As injection-molded, many of the features of walls 104, 106 have sidewalls whose thickness, in a direction orthogonal to the respective planes of webs 414 or 510, exceeds the nominal wall thickness. As seen in FIG. 4B, there are provided a pair of vertical parallel ribs 418, 420 that bound and define a channel in which are disposed the vertical sides of openings 412. Openings 412 take the form of vertically elongate slots. Vertical ribs 418, 420 are connected together by horizontal ribs 421, which in the illustrated embodiment are positioned in between neighboring slots or openings 412. Each screw hole 124 has a thickened surrounding wall 422. Each tie-down hole 126 likewise has a thickened surrounding wall 424. The hand hole 134 is defined and reinforced by concentric surrounding walls 425, 426. Left side or free end 402 is defined by a thickened wall 428, and top margin 130 has a thickened wall 430.

At the bottom of wall 104, a wall 432 defines part of the bottom of a board channel, as will be described in more detail below. Wall 432 extends in a backward direction orthogonally from the web 414. Each prong or barb 404, and each associated recess 408, is defined by a wall thickness substantially similar to the thickness of the board channel bottom wall portion 432, as are a series of reinforcing ribs 434 which extend downwardly from channel bottom wall 432 to the lower edge 406 of the wall 104. The portion of the organizer wall 104 at or below the bottom board channel floor portion 432 constitutes a foot 440 which is wedged into a wall channel of organizer base 102, as will be described below.

As seen in FIG. 5B, wall 106 is generally a mirror image of wall 104, and like parts have been labeled with the same characters. The joining side margin 506 is formed by a thickened wall 512 that projects orthogonally and rearwardly from front web 510. Each of the fingers or hooks 508 is defined by a thickened peripheral wall 514 that extends outwardly from wall 512.

Figure 4C:
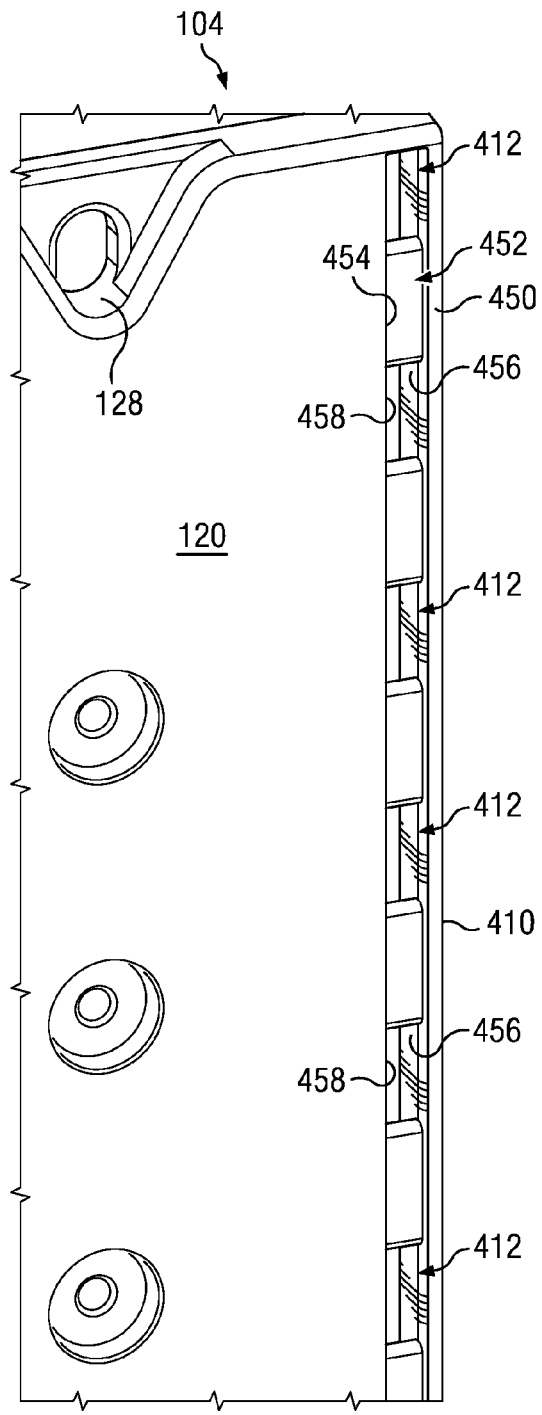
FIG. 4C is a detail of FIG. 4A showing structure of hook-receiving slots and a wall-receiving channel.
Figure 5C:
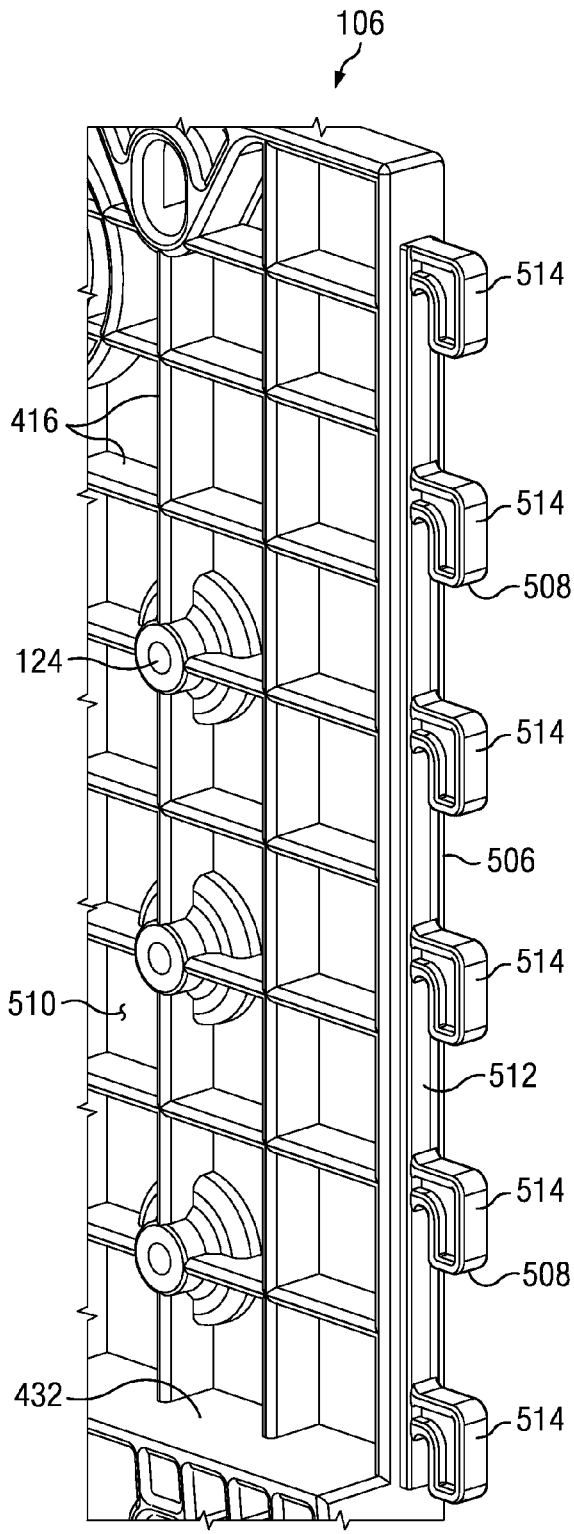
FIG. 5C is a detail of FIG. 5B showing structure of hooks and of the side wall from which they extend.

With reference to FIG. 4C, the right side 410 of the organizer wall 104 is constituted by a thickened rib 450. A vertical channel 452 is formed immediately leftward of the rib 450. A left side 454 of the channel 452 marks the rightward boundary of front surface 120. Each slot 412 has a right edge 456 which is spaced leftwardly from the rib 450, and a left edge 458 which is spaced rightwardly from channel left side 454. Hence, the width of the slots 412 in a horizontal direction is less than a width of the channel 452. Referring to FIG. 5C, the thickened wall 512 has a thickness (front to back) that is greater than the front-to-back thickness of each peripheral wall 514 bounding a hook 508. Upon assembly, the thickened wall 512 of organizer wall 106 will seat within the forward-facing channel 452 once the hooks 508 are received within slots 412. The mating of the thickened wall 512 with the channel 452 enhances the rigidity and strength of the corner formed by organizer walls 104, 106.

Figure 6:
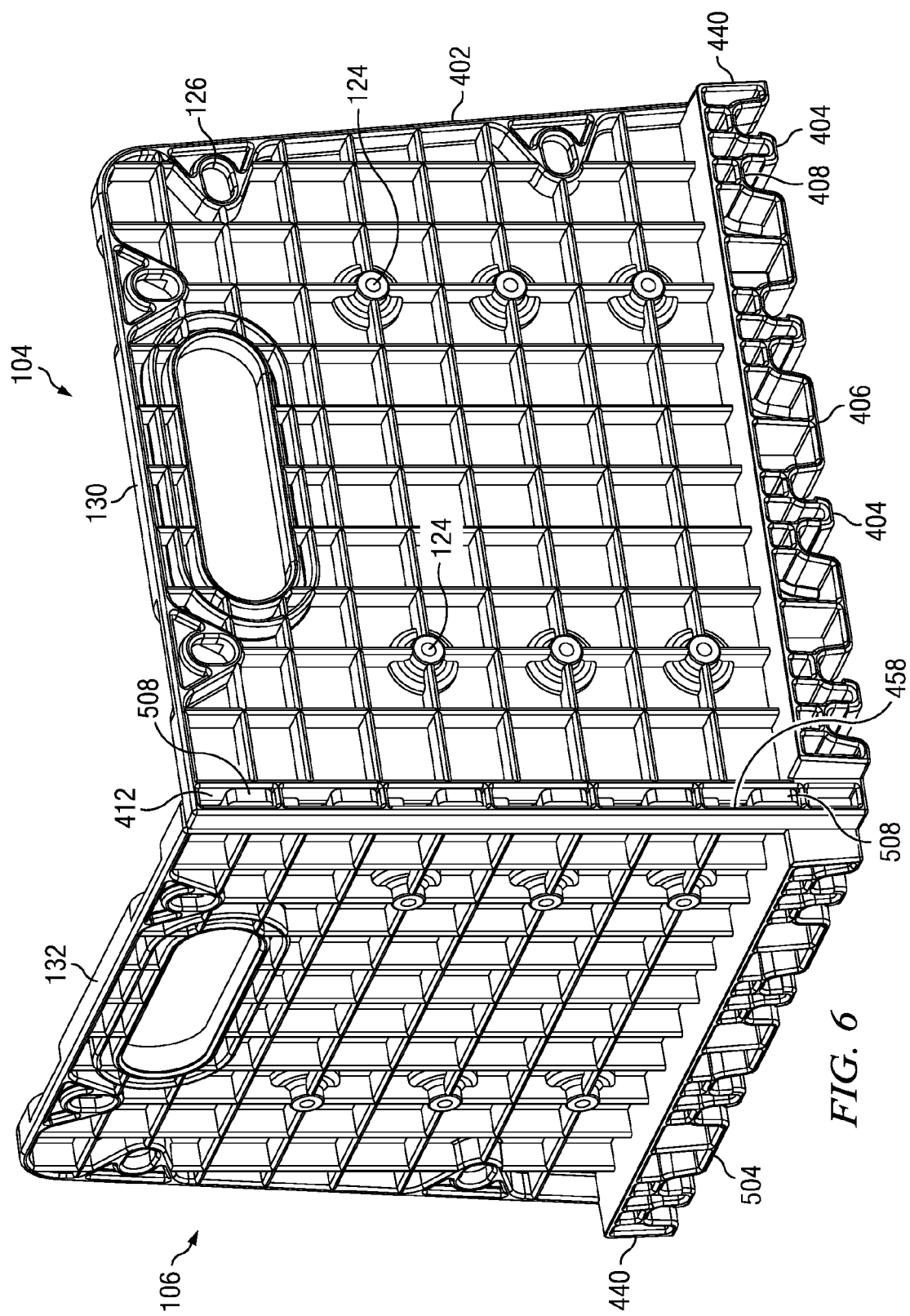
FIG. 6 is a back perspective view of the first and second walls shown in FIGS. 4A-5C, shown at an intermediate stage of assembly.
Figure 6A:
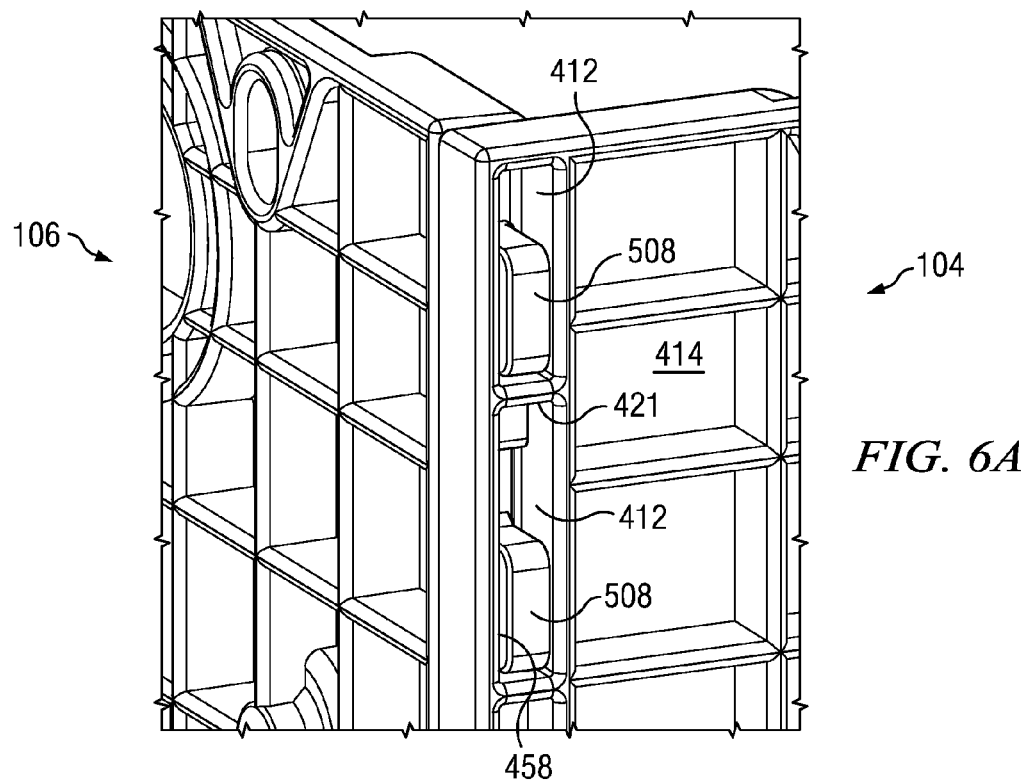
FIG. 6A is a perspective detail of FIG. 6.
Figure 6B:
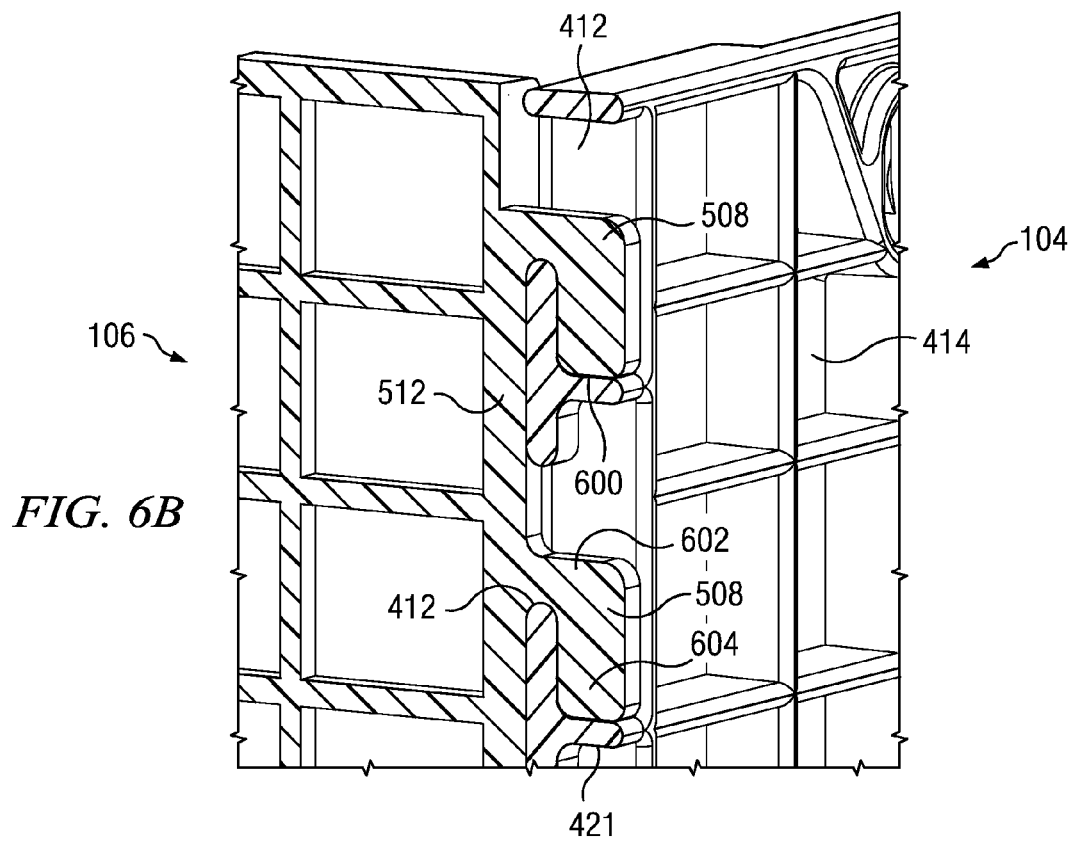
FIG. 6B is a sectional detail of FIG. 6.

As seen in FIGS. 6, 6A and 6B, the hooks 508 are received into the slots 412 when wall 106 is assembled to wall 104. Each finger 508 extends outwardly from the end wall 512 so as to define a hook channel 600 that is open at the bottom. A width of the channel 600 is slightly greater than the thickness of web 414. Each finger 508 has a horizontal segment 602 and, depending from an end of the horizontal segment 602, a vertically disposed segment 604. A length of the vertical segment 604 is chosen to be a little less than a length of the receiving slot 412. The width of peripheral wall 514 is chosen to be a little less than a width of the slots 412. As so dimensioned, the fingers or hooks 508 can be slid sideways into respective slots 412, and then the wall 106 can be pushed downward and into alignment with wall 104, such that top margins 130 and 132 are coplanar and such that the organizer wall feet 440 are aligned with each other. There is at least enough space between a lower end of each slot 412 and the next lower cross-rib 421 to accommodate the free length of vertical finger segment 604.

Figure 7:
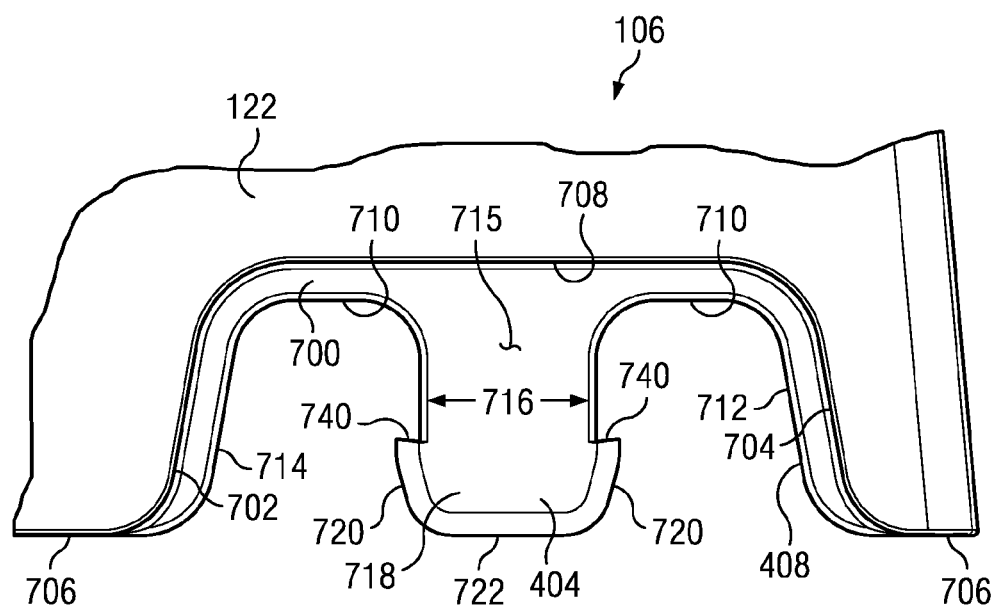
FIG. 7 is a detail of an arrowhead prong or barb which may be used to assemble either of the first and second organizer walls to a base.

One form of a barb 404 is shown in FIG. 7, which is a representative detail of organizer wall 106 at its bottom and rightward corner; in one embodiment the barbs 404 on each wall 104, 106 are similar. Surrounding each recess 408 is a relieved area 700 that has a surface that is parallel to front wall surface 122 but is located in a backward direction from it by a predetermined relief depth. The relieved area 700 is bounded on its left and right sides by tapered margins 702, 704. These margins taper upwardly, such that the distance between them taken at a bottom 706 of the wall 106 is larger than the distance between them taken at a top margin 708 of the relieved area 700. The top margin 708 is disposed upwardly from an upper surface 710 of the recess 408. Margin 704 is displaced rightwardly from a right margin 712 of the recess 408. Margin 702 is displaced leftwardly from a left margin 714 of the recess 408. The transitions between margins 706 and 702, between surfaces 714 and 710, between margins 702 and 708, between margins 708 and 704, and between margins 704 and 706 may all be curved, as shown. Margins 702, 710, 704 together form a periphery of the relieved area 700.

The barb 404 extends downwardly from recess upper surface 710 to a point at or near the bottom margin 706 of the wall 106, and can be centered within the recess 408. Margins 714 and 712 of the recess 408 are horizontally spaced from the barb 404. Barb 404 has a shank 715 with a predetermined horizontal width 716 taken in parallel to inner surface 122. The barb 404 terminates in a head 718 with horizontally extending portions or teeth 720, which may have backwardly and convexly curved surfaces. Back (upper) surfaces 740 of teeth 720 may be disposed at an acute angle, so as to force the engaged receiver tabs towards shank 715 upon any vertical tensile force applied between wall 106 and base 102, such as might be applied in an attempt to pull organizer wall 106 out from base 102. A lower end 722 of the barb 404 may be convexly curved in a direction orthogonal to the wall front surface 122, as shown. The curved surfaces on portions 720 and end 722 aid in registering each barb 404 in a respective barb receiver 212. Further, the curved surfaces on portions 720 reduce stress on rolled side walls or fingers of the receiving member 212 at their junctions with the rear channel walls and the front plates, in a manner which will be described below.

Figure 9A:
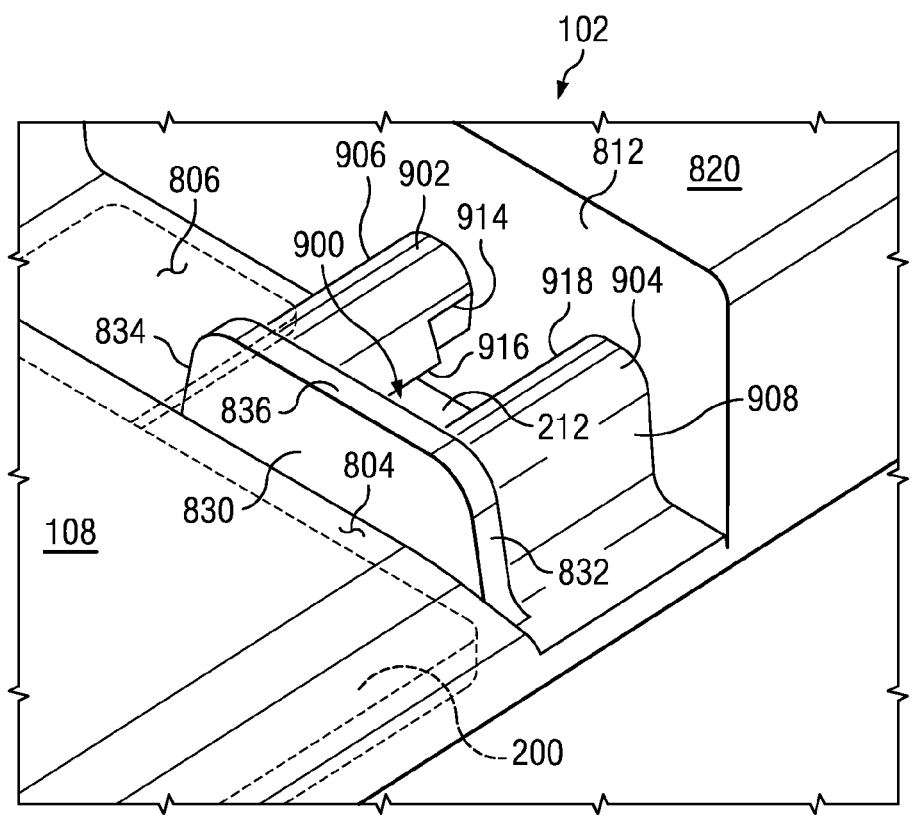
FIG. 9A is a detail of FIG. 9, showing an area around a prong receiver of the base.
Figure 8:
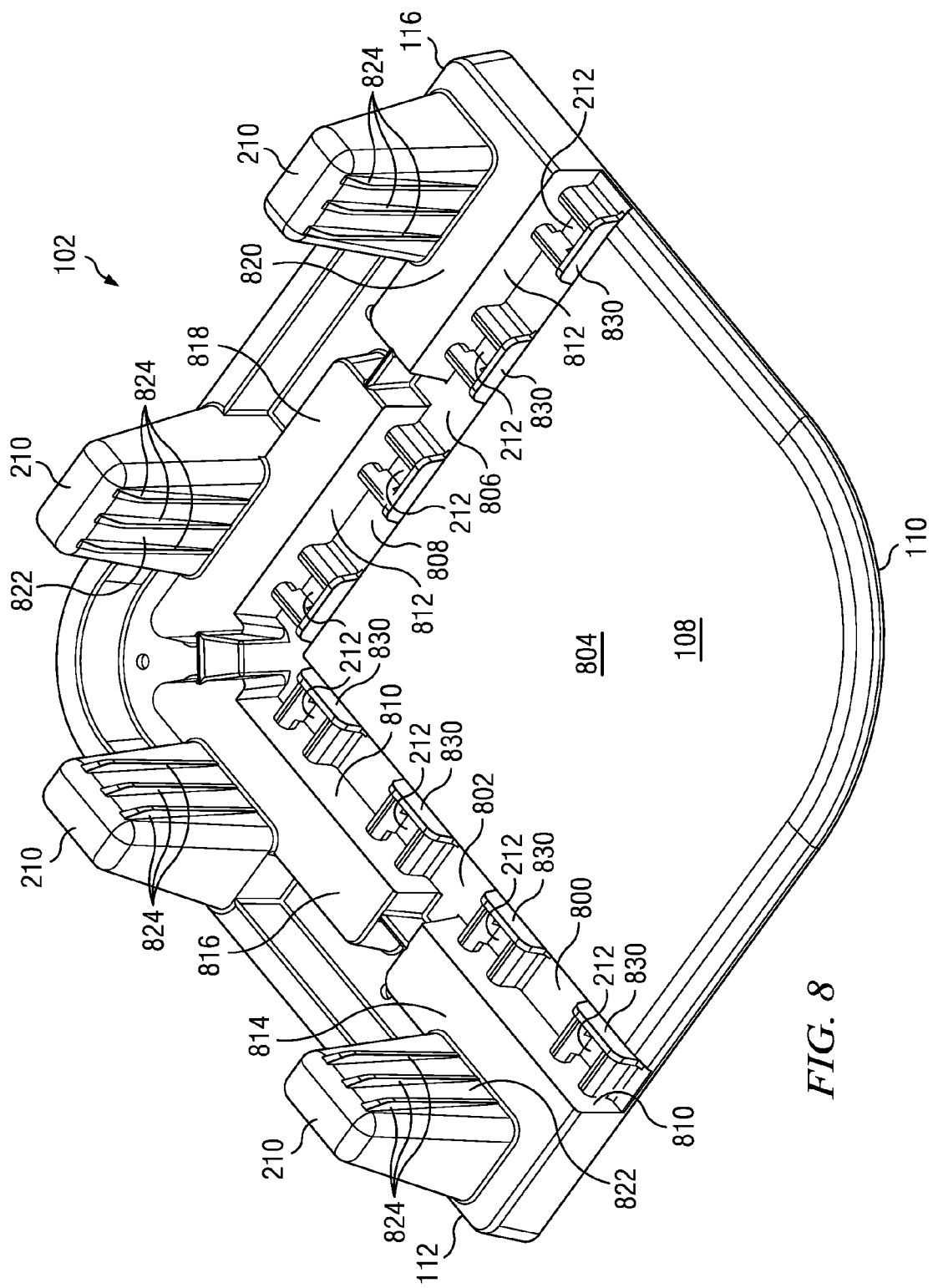
FIG. 8 is a perspective view of a base which may be used as a component of a cargo organizer according to one embodiment of the invention.

Referring now to FIGS. 8 and 9A, further details of the base 102 and its barb receivers 212 are shown. The base 102 has a series of upwardly facing barb receivers 212 that are positioned to receive respective ones of the barbs 404 depending from walls 104 and 106. Referring particularly to FIG. 8, to the rearward and leftward of the base plate 108 is an elongate wall channel 800 having a floor 802 that may be slightly depressed relative to an upper surface 804 of the plate 108. A plurality of barb receivers 212, matching in number and spacing the barbs 404 depending from wall 104, are horizontally spaced apart from each other along this wall channel 800. Similarly, disposed rearward and rightward of the base plate 108 is an elongate wall channel 806, whose floor 808 may be slightly depressed relative to base plate upper surface 804. A second plurality of barb receivers 212, matching in number and spacing the barbs 404 depending from organizer wall 106, are horizontally spaced along wall channel 806. The wall channels 800, 806 have rearward sides 810, 812, which preferably are not vertical but are rearwardly and upwardly sloped. The sides 810, 812 in turn mark the front limits of board channel floor portions 814, 816, 818 and 820, all of which are adapted to receive board ends in the instance that a cargo-containing system 300 is to be constructed.

Each of the towers 210 has a vertical inner face 822 that may be sloped from the vertical. Particularly for tall towers, such sloping or draft may help in the injection molding of the base 102. Each tower inner face 822 is equipped with a plurality of forwardly extending fins or ridges 824. As best seen in FIG. 11, each ridge 824 has a front surface 826 that is vertically aligned except for a curved upper portion. The shape of ridges 824 is therefore narrow at its bottom end, near its junction with a board channel floor portion (floor portion 820 being shown), and wide at point 828 near its upper end.

FIG. 9A is a detail of a representative barb receiver 212 and associated structure. A front plate 830 stands up from upper surface 804 of base plate 108, and helps define the rear boundary of base plate 108. The front plate 830 has an upwardly and leftwardly tapered right margin 832 that mates with right margin 704 of relieved area 700 (FIG. 7). Similarly, an upwardly and rightwardly tapered left margin 834 of front plate 830 mates with left margin 702 of relieved area 700. A top margin 836 of the front plate 830 mates with a top margin 708 of the relieved area 700. A thickness of the front plate 830 is selected to be substantially the same as the relief depth of the relieved area 700 relative to surface 122. Hence, upon assembly of organizer wall 106 to base 102, the front plate 830 will entirely fill in the relieved area 700, and a front surface of the front plate 830 will be coplanar with wall front surface 122. This will occur with all other barb receivers and barbs. The front plates or flanges 830 keeps the walls 104, 106 from wiggling inside of their respective wall channels 800, 806, militating against lateral displacement or torsion, and improving the ability of the barbs 404 and the receivers or latches 212 to rigidly join the organizer walls 104, 106 to the base 102.

Figure 10:
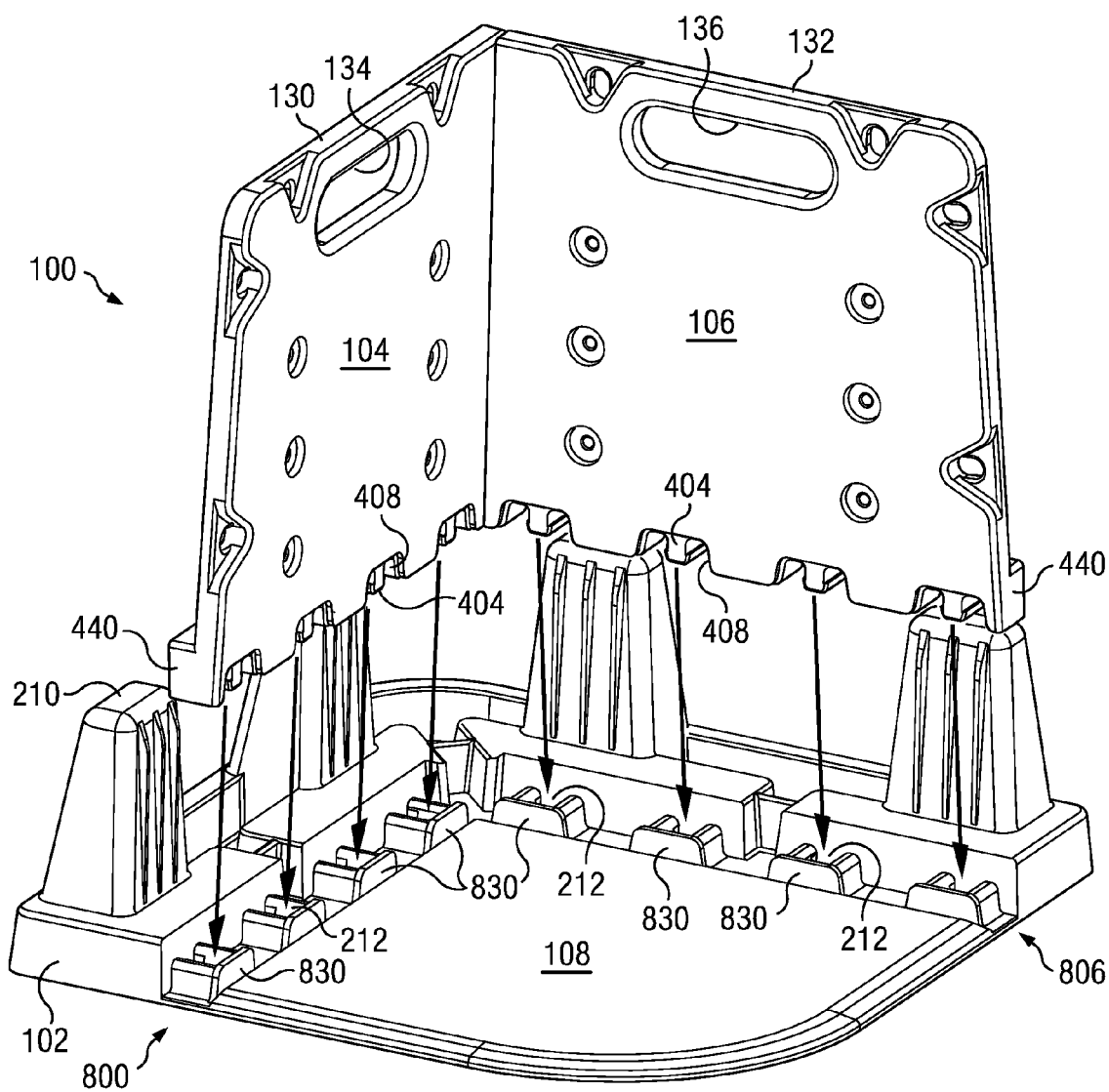
FIG. 10 is a perspective view of a cargo organizer during a final stage of assembly.
Figure 10A:
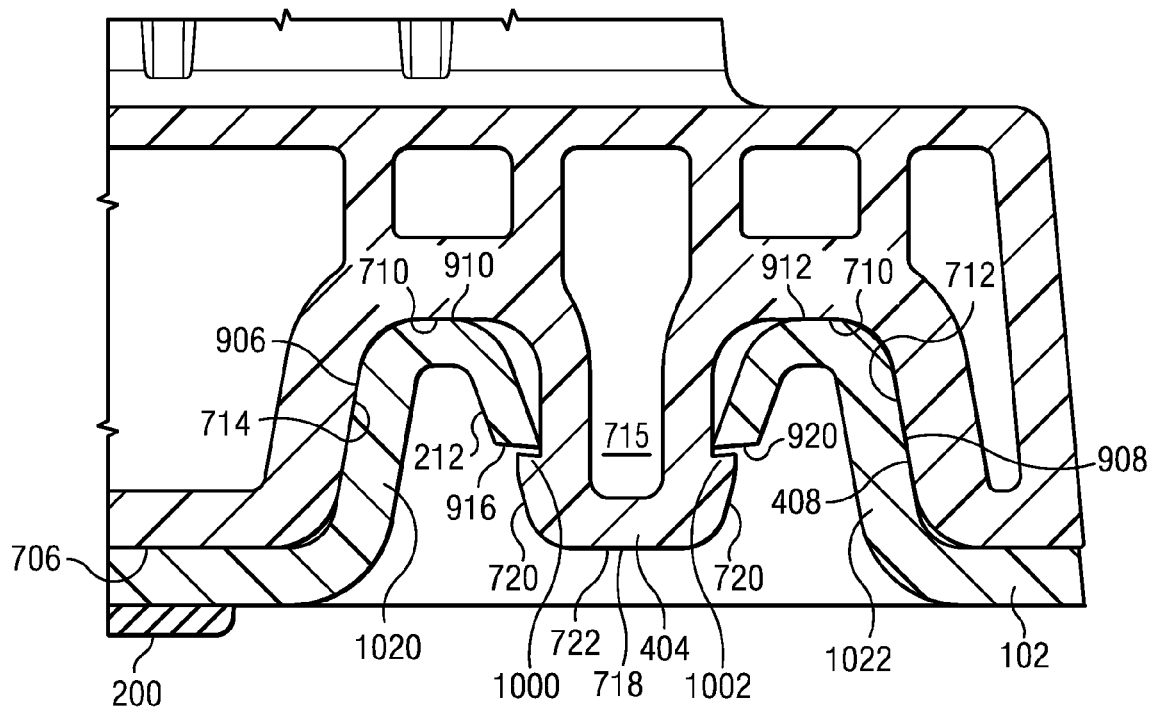
FIG. 10A is a sectional detail of a wall and base assembly.

As seen in FIGS. 9A and 10A, the barb receiver 212 has a central opening 900 that extends from a rear surface of plate 830 to sloped surface or side 812 of the wall channel 806. The sides of opening 900 are defined by left and right spring fingers or latches 902 and 904. A left outer surface 906 of the left finger 902 mates with the left margin 714 of recess 408. A right outer surface 908 mates with the right margin 712 of the recess 408. Curved tops 910, 912 of the respective fingers 902, 904 abut the upper margin 710 of recess 408. The mating of these finger surfaces to respective surfaces of the recess 408 will prevent rocking or other movement in the plane of the wall 104 or 106. Thought of another way, the leftmost member 1020 of spring finger 902, and the rightmost member 1022 of the spring finger 904, form outside members of an "m" whose job it is to align the recess 408 to the upstanding receiver 408.

Left finger 902 terminates in a right margin 914 that includes a central, downwardly and rightwardly protruding tab 916. The tab 916 may intentionally not be connected at its front or back ends (to plate 830 or sloped side 812) so that it will flex more freely when a tooth 720 of barb 404 cams over it. Right finger 904 terminates in a left margin 918 that includes a central, downwardly and leftwardly protruding tab 920 in opposition to the tab 916. The right tab 920 likewise may be intentionally disconnected at its front and/or back ends to plate 830 and sloped side 812 so that it will flex more freely when the opposed tooth 720 of barb 404 cams over it. A small amount of clearance between the barb teeth 1000, 1002 and the ends of tabs 916, 920 permit the barb 404 to overdrive past the tabs 916, 920, assuring that the tabs 916, 920 will snap in behind the barb teeth 1000, 1002. The back-inclined tooth surfaces 740 will, upon tensile force being placed on barb 404 relative to receiver 212, force tabs 916, 920 toward shank 715, preventing their disconnection.

Figure 9:
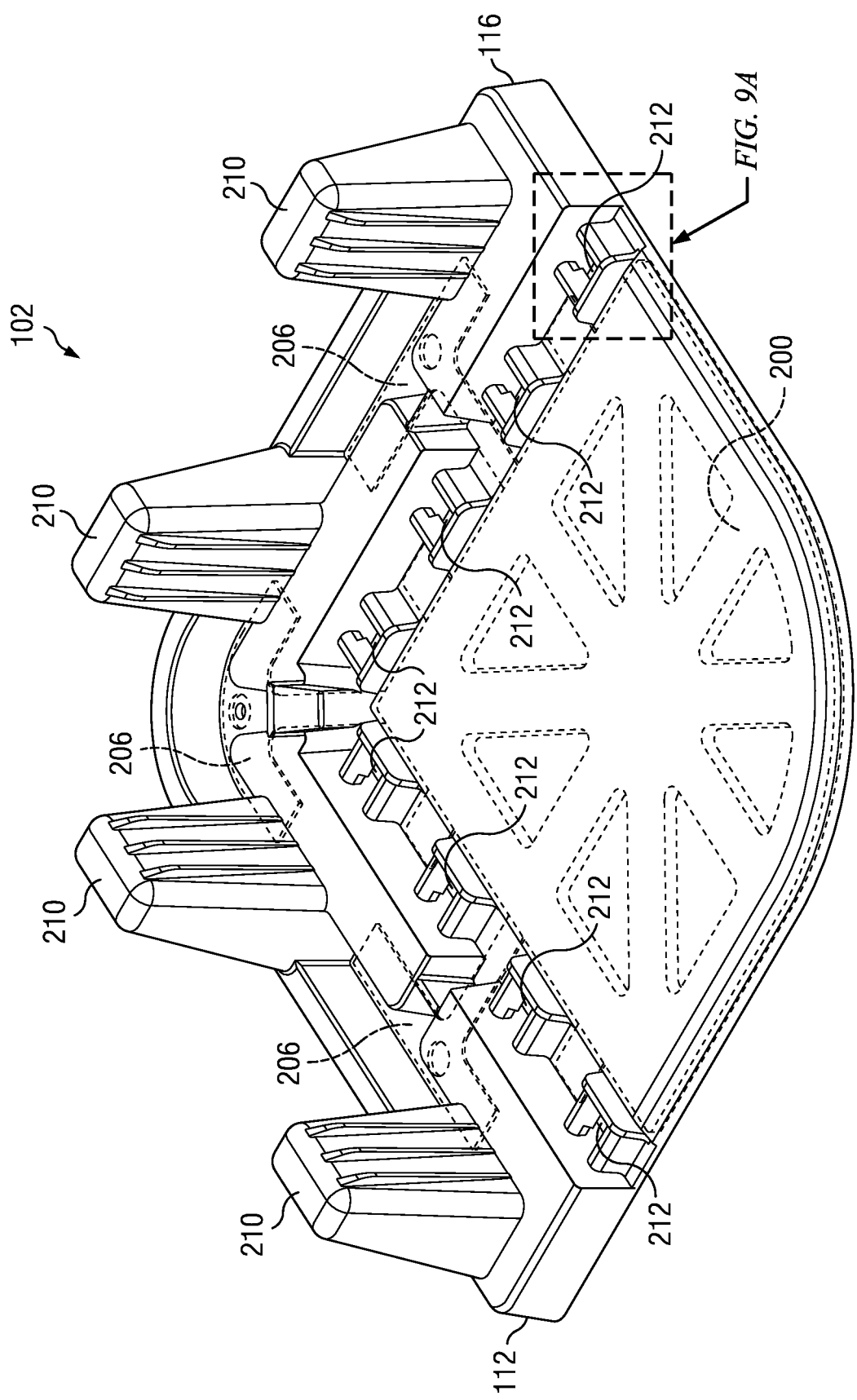
FIG. 9 is a perspective view of the base shown in FIG. 8, and further showing the extent of an overmolded base pad in hidden line.

FIG. 9 is a view similar to that shown in FIG. 1, but with the overmolded version 200 of the friction pad shown in hidden line. The pad bars 206 are seen to be situated between the piers or towers 210, where they will bear much of the weight of the boards used to construct a cargo containment system 300.

To assemble the cargo organizer 100, the hooks 508 of the wall 106 are horizontally inserted into openings 412 of the wall 104, and the wall 106 is then vertically slid down into alignment with wall 104, as seen in FIG. 6. As shown in FIG. 10, the subassembly of walls 104, 106 is then snapped in as a unit into the wall channels 800, 806 of the base 102. During this last stage of assembly, each prong 404 will be snapped into a respective receiver 212. This attachment is one-way and after it is done, the walls 104, 106 will be nearly impossible to be nondestructively remove from base 102. The sloped walls of the recesses 408 mate with the sloped outer sides 1020, 1022 of the latch fingers 902, 904, preventing any lateral movement of the walls 104, 106 and enhancing the strength of the barb/receiver attachment.

Figure 11A:
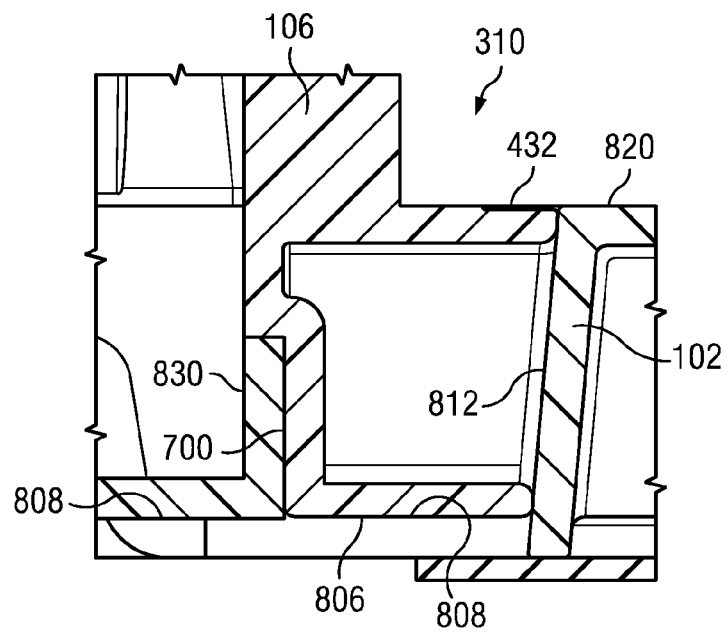
FIG. 11A is a detail cross-sectional view of a wall as inserted into a base wall channel.
Figure 11:
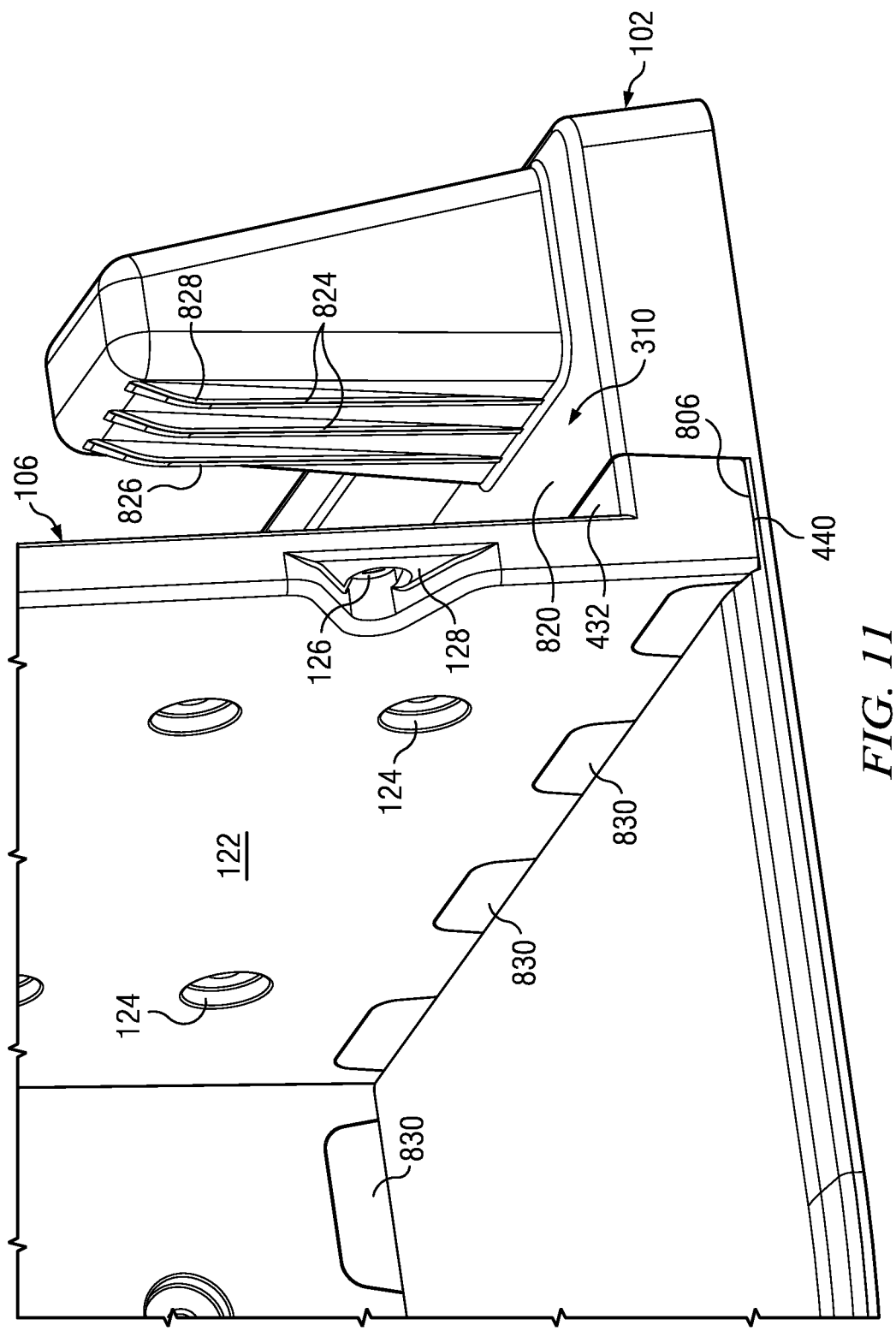
FIG. 11 is a perspective detail of a wall and base assembly showing the use of a wedged wall channel.

FIGS. 11 and 11A disclose details of the junction of the organizer walls (representative wall 106 is shown) with the base 102. A foot 440 of wall 106 is wedged into a wall channel 806 created by sloped rear wall or side 812, wall channel bottom 808 and upstanding receiver flange or plate 830. This produces stability in a frontward-rearward direction. The slope of inclined surface 812 may be on the order of five degrees. As finally assembled, the board channel floor portion 432 of the wall 106 creates a continuous surface with board channel floor portion 820 of the base 102.

Figure 12:
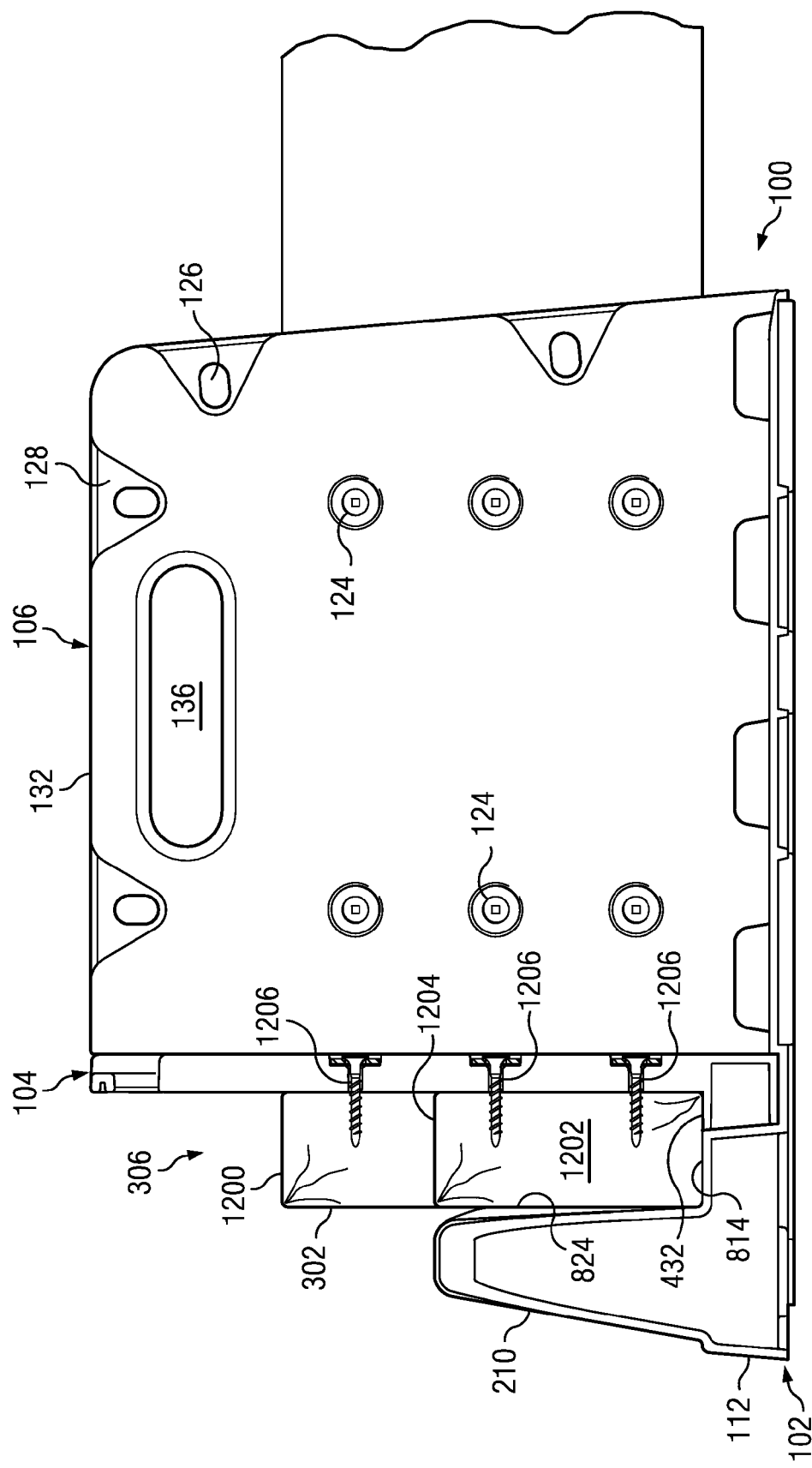
FIG. 12 is an elevational sectional view showing a cargo organizer as assembled to board cross-pieces.

FIG. 12 shows a cargo organizer 100 as assembled to a board to create a part of a cargo containment system (FIG. 3). In the illustrated embodiment, the cargo organizer 100 may take either a 2×6 board 302, which would have a top surface at 1200, or (not as preferred) a 2×4 board 1202, which would have a top surface 1204. Either top surface 1200, 1204 is below a bottom surface of the hand hole 136, so that the handles will not be occluded. A 2×6 board will accept six deck screws 1206 (three shown in this sectional view), while a 2×4 board will accept the bottom four. It is even possible to assemble a cargo containment system without any screws at all, as the board ridges or guides 824 hold the board 302 or 1202 in place against the rear surface of wall 104.

In summary, a cargo organizer and cargo containment system has been shown and described. The cargo organizer has upstanding walls which snap into a base in such a way that there will be no relative movement of the components after assembly. Each organizer further defines board channels for standard-sized lumber in order to construct a cargo containment system which can receive relative large and/or massive articles.

While illustrated embodiments of the present invention have been described and illustrated in the appended drawings, the present invention is not limited thereto but only by the scope and spirit of the appended claims.

We claim:

1. A cargo organizer, comprising:
a base having a left rear margin, a right rear margin, a left front margin opposed to the right rear margin and a right front margin opposed to the left rear margin, a base plate adapted to be placed underneath an article to be contained and extending rearwardly from the right front margin and the left front margin;
at least one first upstanding tower formed on the base to be positioned near the left rear margin, at least one second upstanding tower formed on the base to be positioned near the right rear margin and to be laterally spaced apart from the first upstanding tower;
an upstanding, substantially planar first organizer wall joined to the base to be positioned forwardly from the first upstanding tower and rearwardly from the base plate, the first wall having a right end;
an upstanding, substantially planar second organizer wall joined to the base to be positioned forwardly from the second upstanding tower and rearwardly from the base plate, a left end of the second wall joined to the right end of the first wall such that the first and second walls are at an angle to each other;
the towers each having a forward facing surface and the walls each having a rear surface, a first board channel formed between the forward facing surface of the first tower and the rear surface of the first wall, a second board channel formed between the forward facing surface of the second tower and the rear surface of a second wall and to be at an angle relative to the first board channel, each board channel sized to a receive a board of predetermined dimensions, such that a plurality of cargo organizers optionally may be used with the boards to construct a cargo containment system.

2. The cargo organizer of claim 1, wherein the right front margin of the base and the left front margin of the base are joined by a convex curve.

3. The cargo organizer of claim 1, wherein the first tower is one of a plurality of first towers disposed at the left rear margin of the base and in spaced relation to each other, the second tower being one of a plurality of second towers disposed at the right rear margin and in spaced relation to each other, the first towers being spaced from the second towers, front surfaces of the first towers helping to define the first board channel, front surfaces of the second towers helping to define the second board channel.

4. The cargo organizer of claim 1, wherein the first organizer wall has at least one vertical joining side, a front-facing elongate vertical channel formed to be adjacent the joining side, a plurality of vertically spaced-apart, elongate slots formed within the vertical channel; and
the second organizer wall has at least one vertical joining side formed by a side wall, a plurality of vertically spaced-apart hooks formed to outwardly extend from said side wall, said side wall mating with the vertical channel in the first organizer wall upon assembly of the first organizer wall to the second organizer wall.

5. The cargo organizer of claim 1, wherein the base has a body with a bottom surface, the body of the base formed of a first polymer, a friction pad disposed on the bottom surface of the base, the friction pad formed of a second polymer having a higher coefficient of friction with respect to a substrate on which the cargo organizer is placed than does the first polymer.

\* \* \* \* \*